UNITED STATES PATENT OFFICE.

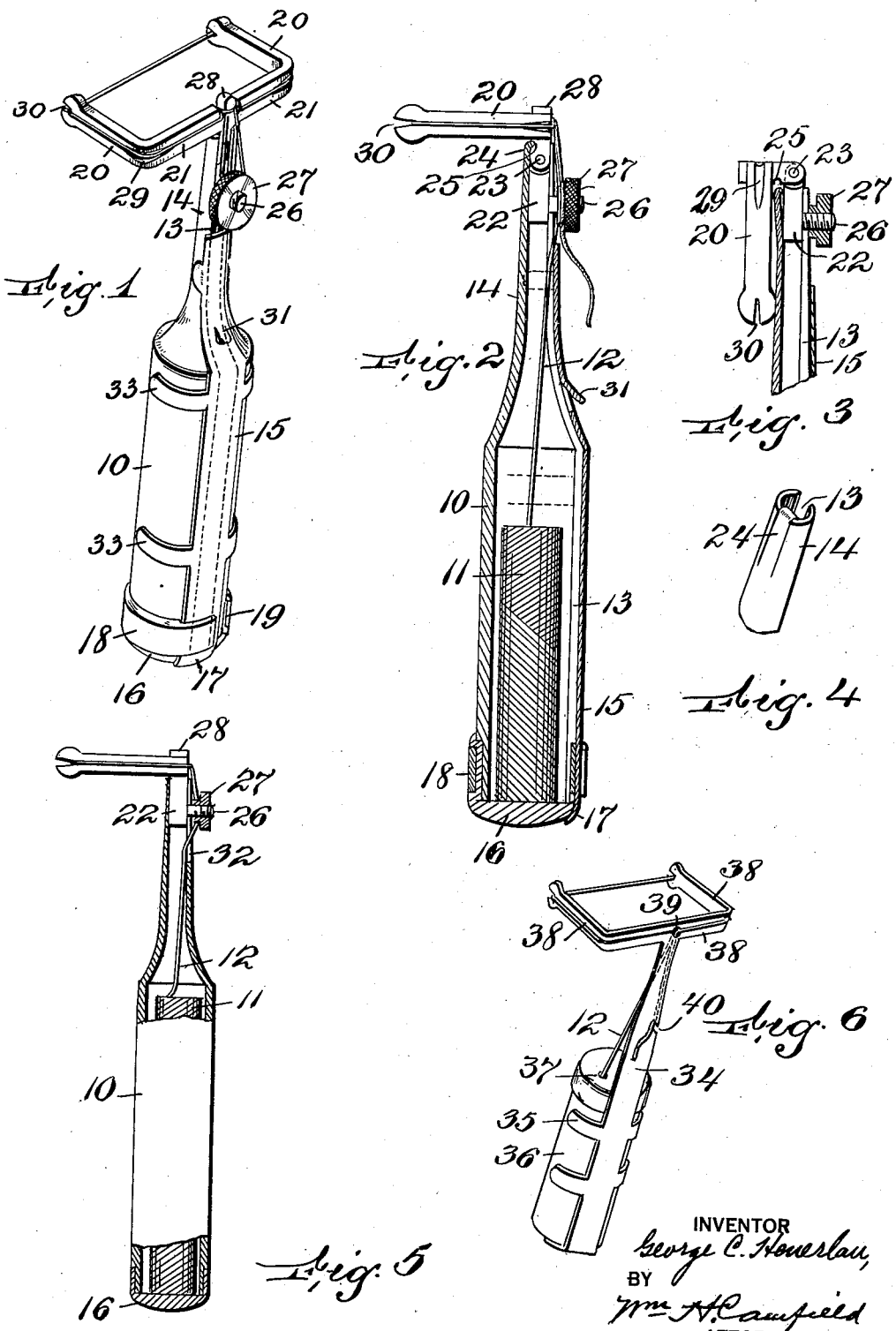

GEORGE C. HENERLAU, OF NEWARK, NEW JERSEY.

DENTAL FLOSS HOLDER.

1,417,518.  Specification of Letters Patent.  Patented May 30, 1922.

Application filed January 25, 1922. Serial No. 531,530.

*To all whom it may concern:*

Be it known that I, GEORGE C. HENERLAU, a citizen of the United States, and a resident of Newark, county of Essex, and State of New Jersey, have invented certain new and useful Improvements in Dental Floss Holders, of which the following is a specification.

This invention relates to an improved holder for dental floss, which comprises a container for holding a spool of dental floss and has separated arms between which a strand of the floss can be stretched, and while thus being held taut is adapted for use on the teeth.

The invention comprises certain details of construction which will be hereinafter more fully described and finally embodied in the claims.

The invention is illustrated in the accompanying drawing, in which Figure 1 is a perspective view of a holder made according to my invention. Figure 2 is a central vertical section of the device shown in Figure 1. Figure 3 is a detail of the upper part of Figure 2 with the arms folded down. Figure 4 is a perspective view of the upper part of the stem of the holder. Figure 5 is a section of a modified form of construction, and Figure 6 is a perspective view of still another modification.

In the form shown in Figures 1 and 2 the container 10 forms a handle which is hollow on the inside so as to form a receptacle or receiver for a spool 11 of dental floss. A strand 12 of the floss is brought to the outside of the device when the spool is inserted through the open end of the handle and without the necessity of threading the strand through any small openings, since the container is slotted, as at 13, the slot extending up through the neck or stem 14, which stem is a narrower extension of the receiver 10.

A shield 15 fits over the side of the container and part way up the stem and covers the slot 13, and since it terminates short of the top of the stem it leaves a space through which the strand 12 can emerge, a suitable closure, such as the cap 16, being slid on the bottom of the container, the cap being held in place by the inturned end 17 of the shield 15, the shield in turn being held in position by the rotatable ring 18 which has an opening 19 which receives the shield 15, but which, when turned, as shown in Figure 1, embraces the shield and holds it in position.

At the top of the holder is a pair of spaced arms 20, these being preferably parallel and being substantially rectangular, the portions 21 of the arms being secured to a stud 22, which stud has a hinge 23 part way up, so that when the stud is slid down so as to enclose the hinge, the arms 20 are held rigidly in position, but if the stud 22 is slid up to expose the hinged part, the arms can be folded down as in Figure 3. This makes the device very convenient for use in small receptacles, particularly when travelling.

The stud is held down and also prevented from going too far by reason of the spring lip 24, usually provided by splitting the stem, as shown in Figure 4, which snaps into a notch 25 in the stud 22, preferably the portion above the hinge, and when the click of the spring is heard the user knows that the device is seated far enough to make it rigid.

On the back of the stud is a screw 26 provided with a nut 27, these parts or any other suitable equivalent means being installed for, first, holding the device against side movement, since the screw 26 passes through the slot 13, and also assists in holding the stud in position when the nut is screwed down tight against the stem, and also acts as a holder for the end of the strand 12. The strand is usually passed up, as above described, over the top edge of the shield 15, and then around a suitable anchor element such as the knob 28, then around the outside of the arms 20, the arms at their corners being slightly notched, as at 29 to keep the strand seated and having notches 30 at their ends to prevent the floss from slipping up or down, and after encircling the arms the floss is preferably wound around the anchor element or knob 28, and then around the hub of the nut 27, or it can be wrapped around the screw 26 before the nut 27 is screwed up, and then tightly held in place by the screwing up of the nut 27.

The floss can be broken to remove the excess portion that has been used, or it can be cut by a suitable blade 31 which can be struck up from the material of the shield 15 and, with its edges sharpened, forms a ready means for cutting the strand. The shield 15 is preferably held in position, and can be easily placed on or taken off the container, by reason of the spring arms 33.

In Figure 5 I show a modification to illustrate the use of the nut 27 as a means for holding the end of the strand and also holding the stud 22 in position. This form shows the stud 22 made rigid, that is, without a hinged portion, so that it is constantly held in position for use, this view also showing a handle or container with its stem provided with only a short slot 32 near the top for the passage of the strand 12.

In Figure 6 I show a modification in which the shield 34, with the spring arms 35, is secured to the container 36, which, in the form shown, comprises the ordinary cylindrical small tin boxes in which dental floss is sold, and the lid of which is provided with a small hole 37 through which the strand 12 can emerge. The arms 38 can be formed integral with the shield 34 by bending up the material, as will be evident. A perforation 39 can be used for feeding the strand 12 through before and after it encircles the outside of the arms 38, and suitable means, such as the notch 40, can provide means for securing the end of the strand 12.

I claim:

1. A dental floss holder comprising a handle forming a holder for a spool of floss and having a stem on its top end, a pair of separated arms on a stud, the stud fitting in the stem, the stud having a hinge therein, which hinge is held against swinging when the stud is slid within the stem to enclose the hinge.

2. A dental floss holder comprising a handle forming a holder for a spool of floss and having a stem on its top end, a pair of separated arms on a stud, the stud fitting in the stem, the stud having a hinge therein, which hinge is held against swinging when the stud is slid within the stem to enclose the hinge, and a nut to hold the stud in the stem.

3. A dental floss holder comprising a container slitted at one side from top to bottom, a shield covering the slit, and having spring arms to embrace the container, the container being narrower at the top to form a stem, the shield terminating short of the top of the stem to permit the passage of a strand of floss from the spool, and separated arms at the top of the stem for holding the strand.

4. A dental floss holder comprising a container slitted at one side from top to bottom, a shield covering the slit and having spring arms to embrace the container, the container being narrower at the top to form a stem, the shield terminating short of the top of the stem to permit the passage of a strand of floss from the spool, and a spreader comprising separated arms with a stud thereon, the stud being hinged part way down and fitting in the stem so that it can be swung downward when part way out and can be held rigid when the hinge is enclosed.

5. A dental floss holder comprising a container slitted at one side from top to bottom, a shield covering the slit and having spring arms to embrace the container, the container being narrower at the top to form a stem, the shield terminating short of the top of the stem to permit the passage of a strand of floss from the spool, a spreader comprising separated arms with a stud thereon, the stud being hinged part way down and fitting in the stem so that it can be swung downward when part way out and can be held rigid when the hinge is enclosed, a screw on the stud projecting through the slit, and a nut on the screw for binding the stud in place and for holding the end of the strand.

In testimony that I claim the foregoing, I have hereto set my hand, this 23rd day of January, 1922.

GEORGE C. HENERLAU.